United States Patent [19]

van Tonder

[11] 4,153,116

[45] May 8, 1979

[54] IMPLEMENT WITH ANGLED BEAM AND MOUNTING STRUCTURE FOR CONNECTION TO A THREE ARM LIFT

[76] Inventor: Willem J. P. van Tonder, Erfdeel, South Africa

[21] Appl. No.: 797,987

[22] Filed: May 18, 1977

[30] Foreign Application Priority Data

May 26, 1976 [ZA] South Africa ............. 76/3173
Sep. 24, 1976 [ZA] South Africa ............. 76/5730
Mar. 18, 1977 [ZA] South Africa ............. 77/1636

[51] Int. Cl.² ................. A01B 59/06; A01B 59/043
[52] U.S. Cl. ........................... 172/446; 172/253; 172/450; 172/451; 172/693
[58] Field of Search ........... 172/253, 439, 446, 447, 172/449, 451, 476, 477, 677, 679, 680, 693, 695, 450; 280/456 A, 460 A, 461 A, 467

[56] References Cited

U.S. PATENT DOCUMENTS

| 2,922,480 | 1/1960 | Seng ............................... 172/679 X |
| 3,749,178 | 7/1973 | Watts .............................. 172/253 X |
| 4,019,755 | 4/1977 | Eisenhardt ...................... 172/451 X |

FOREIGN PATENT DOCUMENTS

| 326743 | 10/1920 | Fed. Rep. of Germany ........... 172/677 |
| 962942 | 5/1957 | Fed. Rep. of Germany ........... 172/679 |
| 1207294 | 8/1959 | France ................................ 172/679 |
| 178267 | 2/1962 | Sweden .............................. 172/439 |
| 779836 | 7/1957 | United Kingdom ................. 172/449 |

*Primary Examiner*—Richard T. Stouffer
*Attorney, Agent, or Firm*—Fred Wiviott

[57] ABSTRACT

A fully mounted implement for working the soil comprising a main frame formed by an angled beam, two transverse beams and a longitudinal beam, soil working elements arranged along the angled beams which is at an angle between 35° and 70° to the longitudinal beam; mounting structure for connecting the implement to a three arm lift of a tractive vehicle including a traction frame defining a transverse slot and having connecting structure for connection to two lower arms of the three arm lift; an upright pin passing through the slot and having connecting structure to any transverse position of one transverse beam of the main frame; and a longitudinal tower beam having connecting structure for connection to a third arm of the three arm lift and connecting structure to any transverse position of both the transverse beams of the main frame. Demountable extensions for the angled beam carrying soil working elements are described.

5 Claims, 9 Drawing Figures

IMPLEMENT WITH ANGLED BEAM AND MOUNTING STRUCTURE FOR CONNECTION TO A THREE ARM LIFT

BACKGROUND OF THE INVENTION

1. Field of the Invention

This invention concerns improvements in and relating to implements, more particularly to the means of connection and mounting of implements for working the soil to tractive vehicles fitted with the usual three arm lift. A useful application of this invention lies in the field of agricultural implements.

2. Description of the Prior Art

For example, in regard to agricultural ploughs the appearance of tractors capable of exerting ever greater tractive powers has enabled increasing rates of ploughing of land area. The necessary increases in the size of ploughs has, however, inherently tended to place a limitation on the use of fully mounted implements with the usual three arm lift. This is generally because a practical limit is reached beyond which the handleability and manoeuvreability qualities of the tractor and plough combination become poor, to such an extent that the potential advantages of such large and powerful tractor-plough combinations are not realised in practice.

Such problems are enhanced in areas where contour ploughing is necessary and where accordingly swivel mounted ploughs are employed. The major problem which arises with increasing size of ploughs is that the plough cannot be lifted clear of the ground since the leverage exerted by its mass becomes so great that the front wheels of the tractor are lifted or the capacity of the three arm lift is unequal to the task. In regard to soil working elements such as plough shares, the share which exerts its action below the surface of the ground must of necessity be mounted on a frame located above the surface of the ground and this results in large torsional forces tending to twist the framework on which the shares are mounted. For reasons such as this the usual practice has been to mount the shares on a beam type of framework aligned fairly close to the direction of tractive effort exerted on the implement so that substantially the full length of the beam is available for counteracting the torsional forces referred to. The beams are angled somewhat in order to provide a transverse width of coverage. In order to fully utilise the large power of tractive powers available in current tractive vehicles a large number of shares must be mounted thus furnishing an increased width ploughed in each pass but introducing the disadvantage that the beams become very long of necessity and as a result can no longer be fully mounted since the lever arm exerted by the mass of the shares on the tractive vehicle becomes very high. Accordingly so called semi-mounted ploughs have been employed, these riding permanently on wheels mounted on the plough which are also given a facility for steering. The manoeuvreability and handleability qualities of such semi-mounted ploughs is, however, poor and particularly in areas requiring contour ploughing and frequent turn-abouts they exhibit severe problems in their use.

The Pat. No. 3039541 granted to E. A. Harden et al. deals with a class of implement which is exemplary of the above described prior art. It shows a powerful tractor pulling a large plough. The plough is, however, semi-mounted, that is it runs on its own wheels, with the resulting disadvantage that the downwards forces resulting both from its weight and the action of the soil on it during ploughing are carried by its own wheels and are not transferred to the tractor. This tends to result in wheel slip of the driving wheels of the tractor as compared with the fully mounted plough which transfers these downward forces to the tractor giving the driving wheels greater traction. This wheel slip places a limitation on the size of a semi-mounted plough that can be pulled and prevents utilization of the full power available from modern tractors. Also, the plough is not swivel mounted which makes it very difficult to plough curves in contour ploughing. The tractor-plough combination is shown as capable of lifting the plough, but the length and weight of plough which can be lifted as shown is limited by the problems mentioned above. This again tends to cause under utilization of the full power available from the modern tractors since a large enough plough of this type to match the tractor power cannot be lifted.

SUMMARY OF THE INVENTION

This invention provides an implement for working the soil which comprises a main frame including two transverse beams and an angled beam, soil working elements mounted on the angled beam, which angled beam is aligned at an angle of between 35° and 70° to the direction of movement of the implement in use, implement mounting structure for connection to a three arm lift of a tractive vehicle which includes a traction frame defining a transversely extending slot, connecting structure adapted for connecting the traction frame to two lower arms of the three arm lift of the tractive vehicle, an upright pin which can pass through the slot in any transverse position of the slot, structure adapted to connect the pin to a transverse beam of the main frame in any transverse position of this beam, a tower beam structure adapted for connecting the tower beam to the two transverse beams of the main frame in any transverse position of these beams, and structure adapted for connection between a third upper arm of the three arm lift and the tower beam.

The invention further provides clamping plates and bolts to serve as the structure adapted to connect the pin to any transverse position of the transverse beam and the structure adapted for connecting the tower beam to any transverse position of the two transverse beams.

In one embodiment the invention provides that the structure adapted for connection between a third upper arm of the three arm lift and the tower beam comprises simply a channel at its forward end through which is passed a pin for connection with the third upper arm of the three arm lift.

In another embodiment, in order to ensure free pivoting between the tractive vehicle and the implement through a larger angle the pin is fixed to the forward end of the tower beam, the traction frame has fixed to it an upright hitch framework which includes structure for connection to the third upper arm of the three arm lift, and a bracket is provided, adapted for fixing in any transverse position of the hitch frame, the bracket having a boss fixed to it, the boss pivotally connected to the top end of the pin.

The invention further contemplates optionally two angled beam extension pieces, each carrying a soil working element, each extension piece adapted to be fixed removably to an end of the angled beam.

The extension parts of the frame permit for example a six share implement to be convertible to a seven share implement or an eight share implement by attachment of one or two extension parts. The leading attachment part should be attached first, for optimum balance of the implement.

It must be stressed that the traction frame transmits tractive effort to the implement through the upright pin, so that accordingly the implement is swivel mounted and suitable for contour ploughing. The tractive vehicle can transmit no torque in a horizontal plane to the implement and the fine adjustment of the mounting means which accordingly is necessary to get the implement pulling straight behind the vehicle is provided for by this invention. At the same time the transverse position of the implement behind the tractive vehicle is independently adjustable. These are primary objects of this invention. The location of the soil working elements (such as plough shares) on the angled beam brings the main weight of the implement closer to the tractive vehicle, making it possible to lift fully a larger implement than one of the discussed prior art kind. Increasing the angle towards the 70° mentioned increases this advantage, but it increases the difficulty of the main frame withstanding the large torsional forces tending to twist the frame discussed with reference to the prior art above. A good compromise is for the angle to be near to 45°.

BRIEF DESCRIPTION OF THE DRAWINGS

The drawings show two embodiments of the invention.

A first embodiment in FIGS. 1, 2, 3 and 4 and a second embodiment in FIGS. 5, 6, 7 and 8, in which.

DESCRIPTION OF THE PREFERRED EMBODIMENTS

As shown in FIGS. 1 to 4 the implement for working the soil is characterised by features in two areas, firstly the connection and mounting means for connection and mounting of the tractive vehicle and by the angle α at which the soil working elements of the implement are aligned.

The basic frame of the implement is fabricated from a main angled beam 1, a longitudinal beam 2 and two transverse beams 3 and 4, the longitudinal beam being parallel with the direction of tractive effort and travel in use and the transverse beams being orthogonal to that direction. The angle α is moreover measured from the direction of tractive effort being indicated in FIG. 1 by the broken line 5 in FIG. 1. In this embodiment the angle is 45°.

The connection and mounting means comprises three main components which can be adjusted separately from each other.

A traction frame 7 of rectangular shape defines a transversely orientated slot 8 and four brackets 46 have two pins 9 for connection with a towing vehicle.

A beam section 10 has attached to it a pin 11 and a spacing plate 12. The beam section 10 is fixed by frictional clamps to be described below.

A tower beam 13 spans between the transverse beams 3 and 4, being fixed to them in an adjustable position in a manner to be described below and has a pin 14 for connection with the tractive vehicle. The tower beam 13 is fixed to the transverse beams 3 and 4 by means of clamps which provide for an entirely frictional grip in any finely adjustable transverse position on the beams 3 and 4. The aft end of the tower 13 is clamped by means of four bolts 15 and a plate 16 which clamp the beam 4 between a plate 17 of the tower 13 forming a flange thereof and the plate 16. Bolts 18 are tightened onto tabs 19 which clamp onto the flange 20 of the beam 3. Again purely frictional gripping is employed so that very fine adjustment is possible if necessary into any transverse position on the beam 3.

The beam part 10 is also clamped in a very finely independently adjustable manner by means of bolts 21 which act on tabs 22 to clamp onto the flange 23 of the beam section 10. Bolts 24 act on tabs 25 to clamp the plate 12, (which is secured by welding to the beam part 10) onto the flange 26 of the main beam 3. The beam part 10 serves as a bearing pad to transfer the tractive effort, (applied to the pin 11 by the traction frame 7), to the main frame transverse beam 3. The pin 11 passes through the slot 8, a plate 27 and a washer 28 are interposed between a securing pin 29 and the bar 7.

The implement is provided with a depth control wheel 30 which is mounted on a bracket hingedly, associated with a pneumatic cylinder 31 for control of the level of the wheel 30. This in practice assists in control of the depth to which the implement will plough, the effect of the wheel being exerted predominantly at the aft end of the implement, the depth of ploughing being controlled near the forward end predominantly by the tractive vehicle. Wheel 30 does not carry the implement weight and the implement is not a semi-mounted implement but a fully mounted implement.

This implement is for example mounted with seven plough shares at mounting points schematically indicated by brackets 32. The brackets 32 are fixed along the main beam 1 and accordingly the positions of the plough shares are aligned at the angle α to the direction 5 of the tractive effort in use, the direction 5 also coinciding with the direction of movement in use.

It is advantageous to connect and mount the implement on the tractive vehicle by a means of a quick coupling component which is conventional and is not shown. As is known such a quick coupling component is fixed to the three arm lift of a tractive vehicle. Hooks on the quick coupling component hook onto the pins 9 in the implement and onto the pin 14 passed through the tower 13 of the implement.

The mounting on the three arm lift of the tractive vehicle results in the implement being "fully mounted" that is it may be lifted entirely free of the ground by the tractive vehicle's hydraulic system.

This is made possible by the large value of the angle α which brings the main mass of the implement comprising the main beam 1 and all the plough shares close to the tractive vehicle so that the weight couple does not become too excessive to be lifted by the tractive vehicle. Also the large value of the angle α permits that a considerable width may be ploughed in one pass without it being necessitated for the beam 1 to be excessively long. In this example the seven shares are spaced approximately 760 mm from each other providing a total ploughed width of over four and a half meters. The most important advantage, however, is of course making possible that the implement be fully mounted. It must be stressed in this regard that the wheel 30 does not suggest that the implement is semi-mounted; in this case its function being merely depth control.

When the implement is mounted and connected to a tractive vehicle the transverse position of the centre line 33 of the implement relative to the centre line 34 of the tractive vehicle must be adjusted to a convenient value. This is achieved by adjustment of the transverse position of the tower 13. The tower 13 remains coincident with an extension of the centre line of the tractive vehicle and the implement can be adjusted to one side or the other into any desired fineness of adjustment by loosening the clamping tabs 22 and then tightening them in the desired position.

Figure 1:
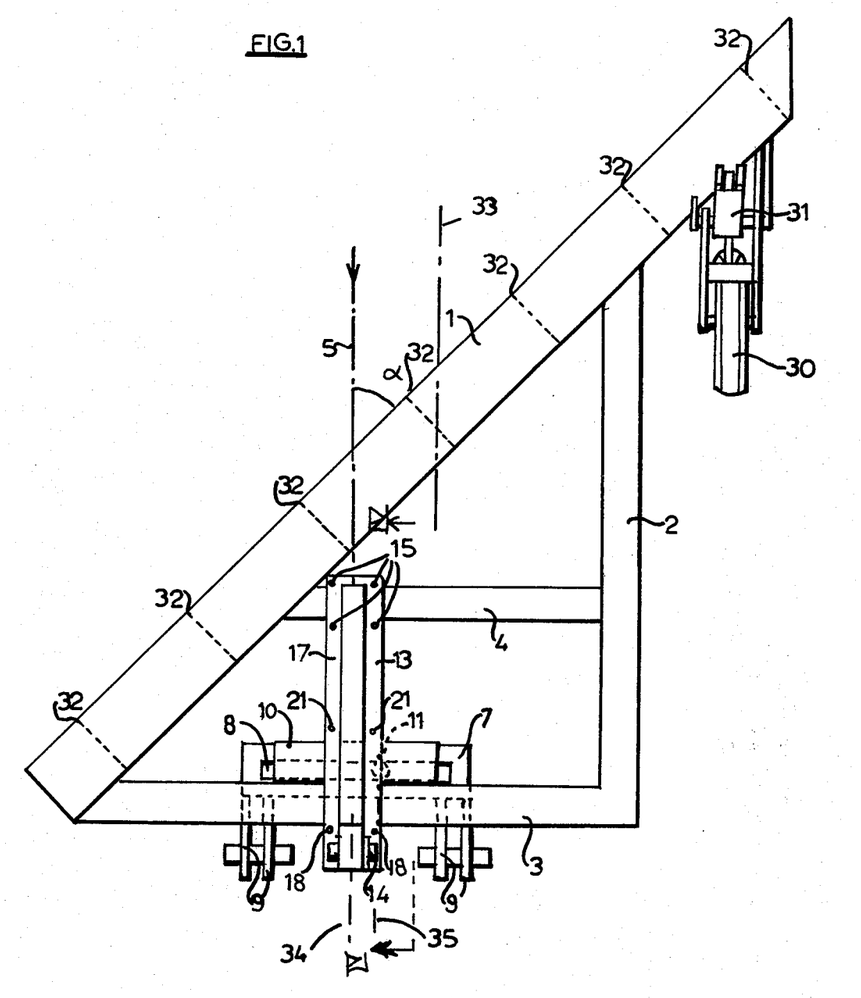
FIG. 1 is a plan view.
Figure 2:
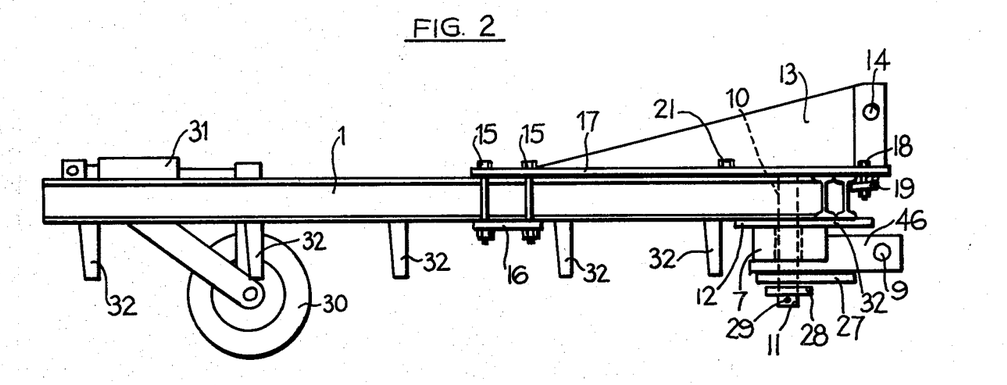
FIG. 2 a side elevation.
Figure 3:
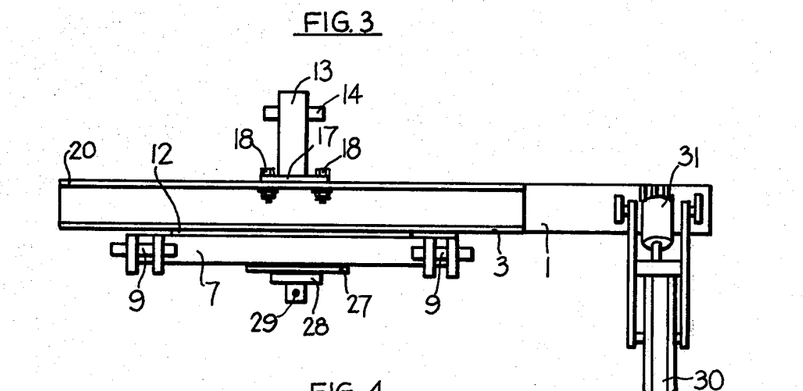
FIG. 3 a front elevation.
Figure 4:
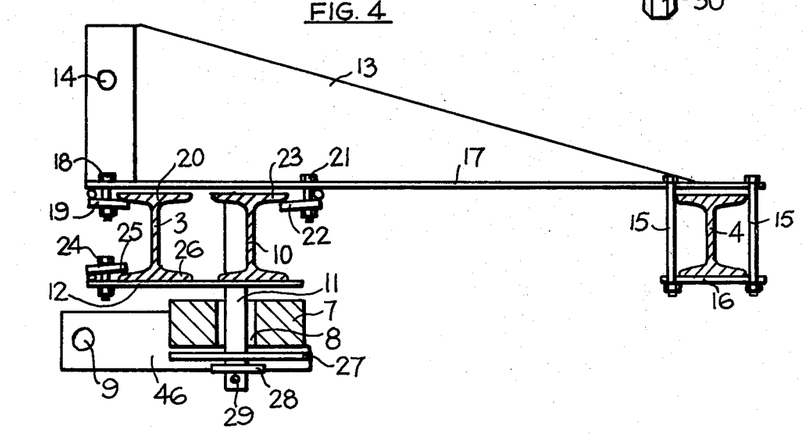
FIG. 4 a cross sectional side elevation on section IV to IV of FIG. 1, on an enlarged scale.

Depending on the adjusted position of the implement it may very likely be found that initially it will not pull straight behind the towing vehicle. This is then corrected by adjustment of the position of the pin 11 by adjusting in turn the beam section 10. This is carried out by loosening the clamping tabs 22 and 25 and shifting the beam section 10 to one side or the other and testing the implement after each adjustment until it tows correctly. Here considerable fineness of adjustment is important and for example an adjustment of 6 mm or even as little as 3 mm to one side or the other may be desirable to achieve perfected balance. The clamps 22 and 25 are of course secured in the desired position of adjustment. It will be realised that this adjustment is made possible by virtue of the fact that the pin 11 works in the slot 8 and when the adjustment is made the pin 11 moves to one side or other in the slot 8. In FIG. 1 pin 11 is shown in position 35, for example. It will also be appreciated that the pin 11 provides for completely free pivotal connection of the implement to the tractive vehicle when it is in the working position.

In the working position the connection with the tower 13 by means of the pin 14 is made completely inoperative and if necessary the upper arm of the three arm lift must be adjusted to achieve this.

This will ensure that the tractive effort or at least the vast majority of it is exerted through the pin 11 and as stated the adjustment of the transverse position of this pin will ensure that the implement can be towed pulling true and straight behind the tractive vehicle. Thus it will be seen that the adjustment on the one hand of the position of the implement behind the vehicle transversely and on the other hand of the position at which the tractive effort is transmitted to the implement are completely independent of each other. Hence for example with a double tyred tractive vehicle the implement may be moved to one side sufficiently to obtain convenient ploughing without the necessity of running the double tyre in previously ploughed land or of removing one of the double tyres to permit running in the lead furrow of a previously ploughed stretch. Instead the double tyres may be left on and the implement moved by a transverse adjustment to the desired position and thereafter the second adjustment described can be made to ensure that it runs true.

The embodiment shown in FIGS. 5 to 8 has the same basic frame as that shown in FIGS. 1 to 4 and accordingly the same reference numerals are used for corresponding parts; (no depth control wheel is used, however).

The connection and mounting means is distinguished from that shown in FIGS. 1 to 4 primarily by the provision of a hitch framework 41 on the traction frame 7, into which hitch framework 41 the pin 14 is placed and by the feature that the vertical pin 11 is adapted at its upper end for pivotal connection by means of a boss 40 to the frame 41 in a manner allowing free pivoting on the vertical axis through an angle at least as large as the angle through which the means 7 defining the transversely orientated slot 8 is able to pivot on the pin 11. In fact the boss 40 is rigidly connected with the means 7 defining the slot 8, located in a position above the slot 8, the axis of the boss passing through the slot 8, and being vertical, the boss 40 adapted, however, to be fixed in any transverse position relative to the slot 8. The means 7 defining the slot 8, being the two transverse bars 7 has the rigid framework 41 fixed to it including an elongated transverse bar 42 upon which a bracket 43 is clamped in a manner allowing loosening of the clamp and reclamping in any position on the transverse bar.

The length of the transverse bar 42 thus defines the range of positions within which the boss may be clamped in any desired position. The clamping is achieved by means of bolts 44 and underneath plates 45. The bolts 44 may be loosened to shift the bracket 43 and locate it in any desired position on the bar 42 and then retightened. The bracket 43 has the boss 40 fixed to it. The fixing of the rigid framework 41 to the bars 7 which define the slot 8 is done by means of the intermediary of the lugs 46 located at the opposite ends of the bars 7 and which also carry the pins 9 for connection with the tractor. The third of the three point connections for connection to the tractor comprising the pin 14 is mounted in two members 47 of the rigid framework 41.

A further important difference from the embodiment described in FIGS. 1 to 4 is that the vertical pin 11 is welded to the tower 13 and the beam section 10 is also welded to the tower 13. The adjustment of the transverse position of the tractive effort applied to the implement is achieved in this embodiment by adjusting the transverse position of the tower 13 on the main frame of the implement comprising the members 1, 2, 3 and 4. This is done by loosening the bolts 15, 18 and 24 and sliding the tower 13 transversely on the transverse members 3 and 4. Then the bolts 15, 18 and 24 are tightened. Since the tractive effort is applied through the pin 11 which cannot transmit any torque to the bars 7 the position of the pin 11 determines the transverse position of application of the tractive effort to the implement. Then the relative transverse position of the longitudinal axis of the tractive vehicle and the longitudinal axis of the implement is adjustable by loosening the bolts 44 and sliding the bar 42 relative to the bracket 43 until a satisfactory position is achieved. This will generally be achieved by trial and error in the field.

It is an important feature of the transverse adjustments that no holes are used, only frictional grip. This makes possible the fine adjustment which experience has shown to be necessary.

Figure 5:
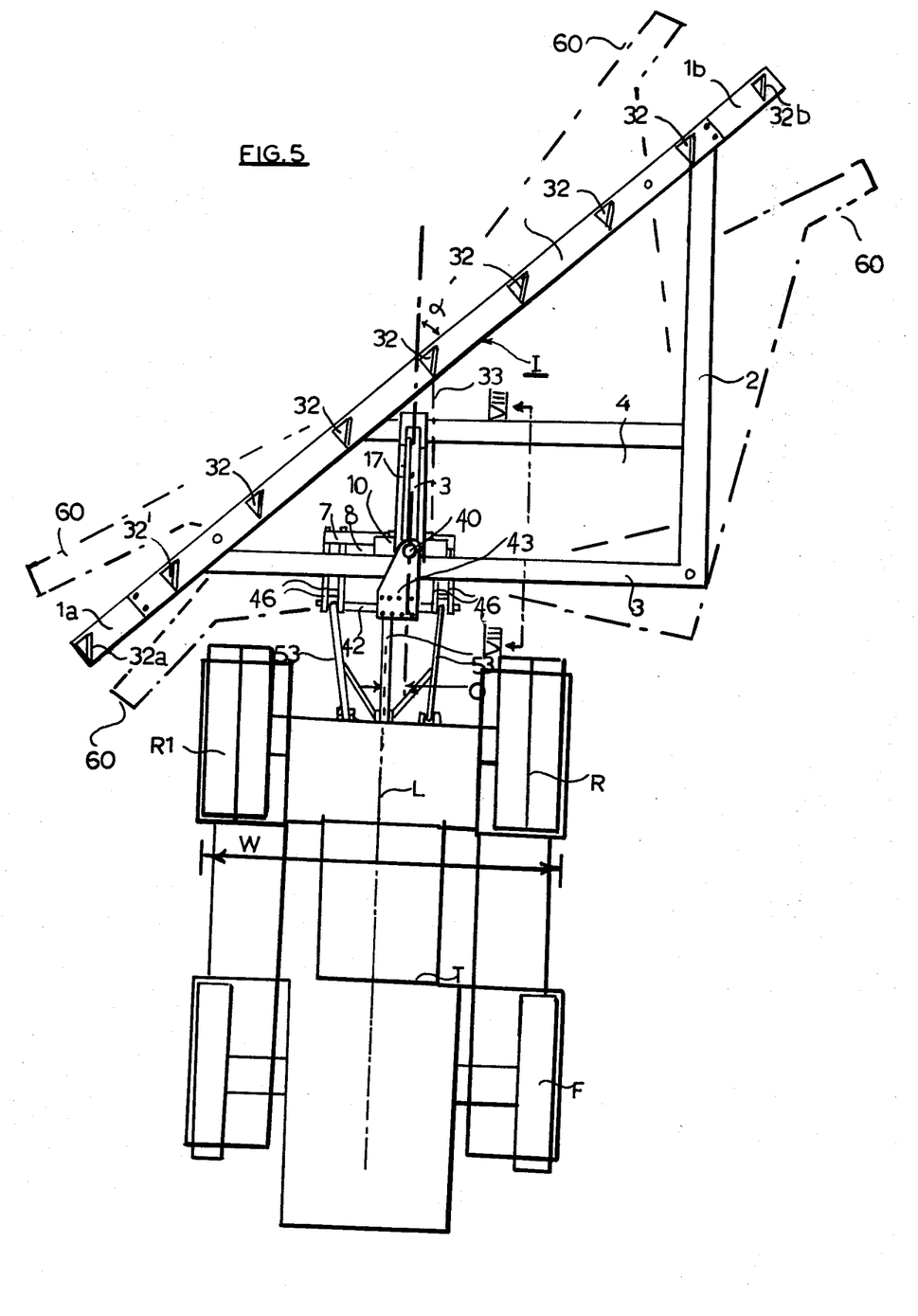
FIG. 5 is a plan view.
Figure 6:
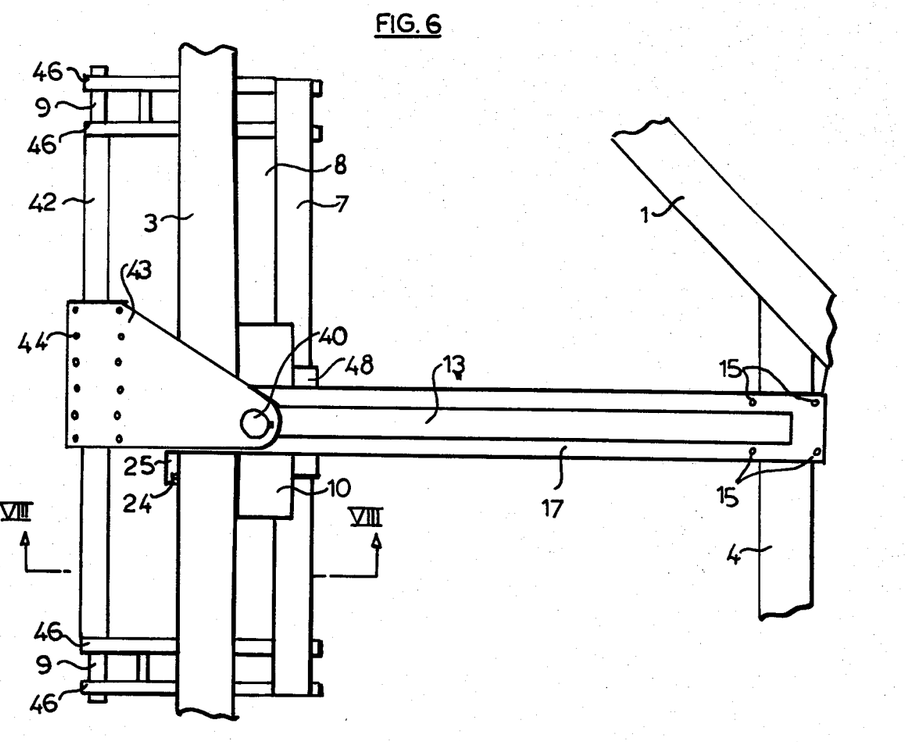
FIG. 6 is a partial plan view on an enlarged scale.
Figure 7:
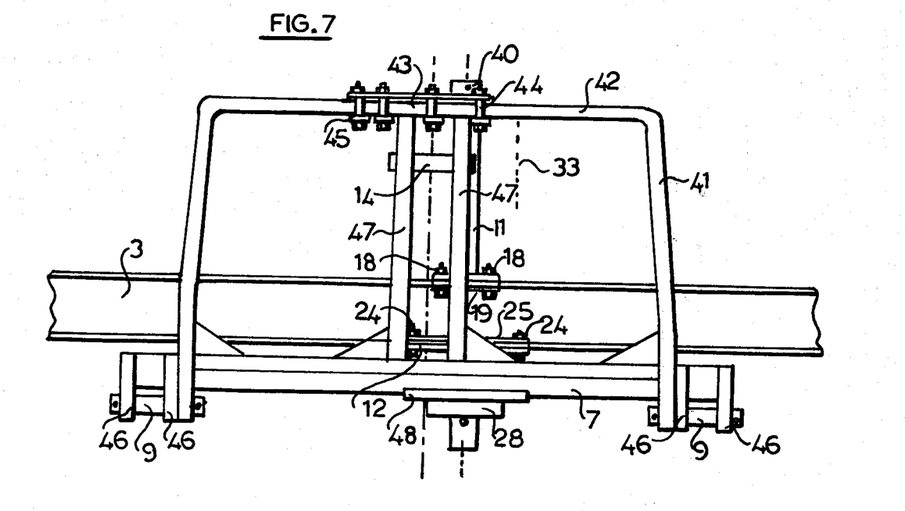
FIG. 7 is a partial front elevation on the same enlarged scale.
Figure 8:
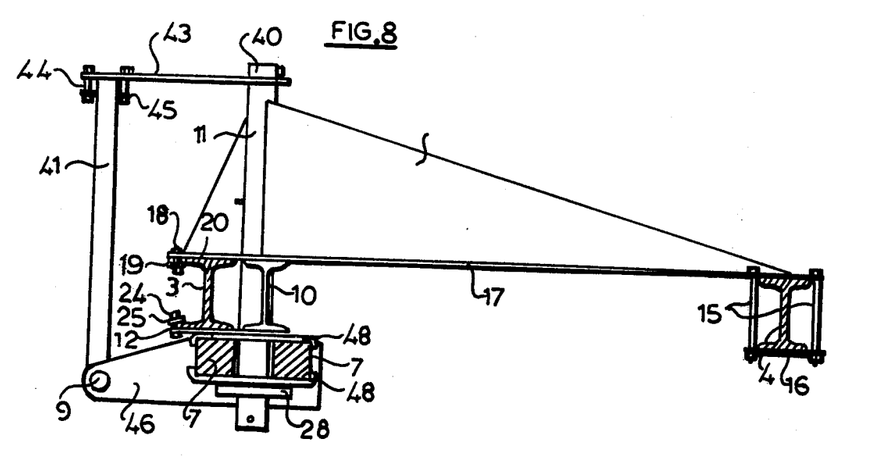
FIG. 8 is a partial cross sectional side elevation on the same enlarged scale.
Figure 8A:
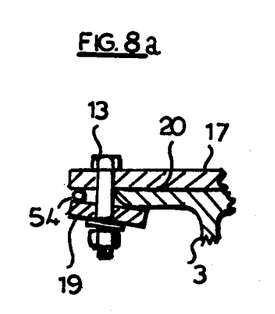
FIG. 8(a) is an enlarged detail shown on FIG. 8.

FIG. 5 shows an important preferred feature that the angled beam 1 can have a forward extension piece 1(a) and a rearward extension piece 1(b) removably fixed to it, each carrying a share 32(a) and 32(b) respectively.

As shown in FIG. 5 the tractor T has the implement I hitched behind it on the arms 53 of the three point lift.

Tractor T is illustrated with double rear wheels R and front wheels F. The leading end of the main beam 1 extension part 1(a) is located adjacent the one rear wheel pair R₁, and outside the transverse wheelbase W. If extension part 1(a) were removed the share 32' which would then be the leading share would still be outside the transverse wheelbase W and adjacent the rear wheel pair R₁. This sketch shows how the longitudinal centre Line L of the tractor T is offset by distance O from the imaginary longitudinal line passing through the pin 11 through which the tractive effort is transmitted to the implement I. This is possible by virtue of the independent adjustability of the position of the transverse bar 42 to the plate 43 and the position of the tower 13 on the transverse beams 3 and 4 of the implement I. This makes possible a suitable locating of the relative transverse positions of the tractor T and implement I, and ultimately thus the proximity of the tractor T to the lead furrow during ploughing and also balancing of the implement I to pull straight. For example an 8 share implement of this type, mounted on the 3 point linkage of the tractor (and thus liftable for turning and reversing), ploughed 192" width using a 120 H P tractor. Broken lines 60 in FIG. 5 show how the implement is free to swing to either side if the tractive vehicle turns round curves during contour ploughing.

What is claimed is:

1. An implement for working the soil which comprises a main frame including two transverse beams and an angled beam, soil working elements mounted on said angled beam, which angled beam is aligned at an angle of between 35 degrees and 70 degrees to the direction of movement of the implement in use, implement mounting structure for connection to a three arm lift of a tractive vehicle, the implement including a traction frame defining a transversely extending slot, connecting structure adapted for connecting the traction frame to two lower arms of the three arm lift of the tractive vehicle, an upright pin which can pass through the slot in any transverse position of the slot, structure adapted to connect the pin to a transverse beam of the main frame in any transverse position of this beam, a tower beam, structure adapted for connecting the tower beam to the two transverse beams of the main frame in any transverse position of these beams, and structure adapted for connection between a third upper arm of the three arm lift and the tower beam which comprises a channel at its forward end through which is passed a horizontal pin for connection with the third upper arm of the three arm lift, the horizontal pin being fixed to a beam part which is adapted to be connected to the foremost of the two transverse beams lying parallel to and behind the said transverse beam.

2. An implement as claimed in claim 1, in which the structure adapted to connect the upright pin to any transverse position of the transverse beam and the structure adapted for connecting the tower beam to any transverse position of the two transverse beams comprises clamping plates and bolts.

3. An implement as claimed in claim 1, in which the upright pin is fixed to the forward end of the tower beam, in which the traction frame has fixed to it an upright hitch framework which includes structure for connection to the third upper arm of the three arm lift, a bracket adapted fixing in any transverse position of the hitch frame, the bracket having a boss fixed to it, the boss pivotally connected to the top end of the upright pin.

4. An implement as claimed in claim 1, which comprises two angled beam extension pieces, each carrying a soil working element, each extension piece adapted to be fixed removably to an end of the angled beam.

5. An implement for working with soil which comprises a main frame including two transverse beams and an angled beam, soil working elements mounted on the angled beam, which angled beam is aligned at an angle of between 35 degrees and 70 degrees to the direction of movement of the implement in use, implement mounting structure for connection to a three arm lift of a tractive vehicle which includes a traction frame defining a transversely extending slot, connecting structure adapted for connecting the traction frame to two lower arms of the three arm lift of the tractive vehicle, an upright pin which can pass through the slot in any transverse position of the slot, structure adapted to connect the pin to a transverse beam of the main frame in any transverse position of this beam, a tower beam, structure adapted for connecting the tower beam to the two transverse beams of the main frame in any transverse position of these beams, and structure adapted for connection between a third upper arm of the three arm lift and the tower beam, said pin being fixed to the forward end of the tower beam, in which the traction frame has fixed to it an upright hitch framework which includes structure for connection to the third upper arm of the three arm lift, and a bracket adapted for fixing any changes in position of the hitch frame, the bracket having a boss fixed to it, the boss being pivotally connected to the top end of the upright pin.

* * * * *

UNITED STATES PATENT AND TRADEMARK OFFICE
CERTIFICATE OF CORRECTION

PATENT NO. : 4,153,116
DATED : May 8, 1979
INVENTOR(S) : Willem J. P. van Tonder It is certified that error appears in the above-identified patent and that said Letters Patent are hereby corrected as shown below:

Column 7, line 50, cancel "horizontal" and substitute
--upright--.

Signed and Sealed this

Twenty-eighth Day of October 1980

[SEAL]

Attest:

SIDNEY A. DIAMOND

Attesting Officer          Commissioner of Patents and Trademarks